United States Patent
Prehofer (10) Patent No.: US 8,023,465 B2
(45) Date of Patent: Sep. 20, 2011

(54) APPARATUS AND METHOD FOR IMPROVED HANDOVER IN MESH NETWORKS

(75) Inventor: Christian Prehofer, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 784 days.

(21) Appl. No.: 11/474,302

(22) Filed: Jun. 22, 2006

(65) Prior Publication Data

US 2007/0019598 A1   Jan. 25, 2007

(30) Foreign Application Priority Data

Jun. 30, 2005  (EP) .................................. 05105989

(51) Int. Cl.
*G08C 17/00* (2006.01)
(52) U.S. Cl. ..................................................... 370/331
(58) Field of Classification Search .......... 370/329–331, 370/335; 455/436–444
See application file for complete search history.

(56) References Cited

U.S. PATENT DOCUMENTS

| | | | |
|---|---|---|---|
| 6,570,856 B1 * | 5/2003 | Freeburg et al. | 370/310.1 |
| 6,977,938 B2 * | 12/2005 | Alriksson et al. | 370/401 |
| 2004/0203787 A1 * | 10/2004 | Naghian | 455/437 |

FOREIGN PATENT DOCUMENTS

| | | |
|---|---|---|
| EP | 0 984 656 A2 | 3/2000 |
| EP | 1 058 473 A1 | 12/2000 |

OTHER PUBLICATIONS

European Search Report dated Dec. 5, 2005.

* cited by examiner

*Primary Examiner* — Rafael Perez Gutierrez
*Assistant Examiner* — Munjalkumar Patel
(74) *Attorney, Agent, or Firm* — Nutter McClennen & Fish LLP; John J. Penny, Jr.

(57) ABSTRACT

A method for performing a handover in a mesh network for a plurality of nodes (A, A', B) of said mesh network from a first access point (AP1) to a second access point (AP2), whereas said plurality of nodes (A, A', B) forms a tree of nodes, said tree comprising a root node (B) and one or more further nodes (A,A') connected to said root node either directly or via intermediate nodes, and said handover being performed for said tree of nodes in a coordinated fashion, said method comprising:

forwarding to said members of said tree (A, A', B) information about said second access point (AP2) and timing information to enable a coordinated handover of said nodes of said tree;

switching said root node (B) and said further (A,A') nodes from said first access point to said second access point according to said timing information.

13 Claims, 2 Drawing Sheets

APPARATUS AND METHOD FOR IMPROVED HANDOVER IN MESH NETWORKS

FIELD OF THE INVENTION

The present invention relates to and apparatus and a method for improved handover in mesh networks.

BACKGROUND OF THE INVENTION

In multi-hop wireless access networks, also called mesh networks, mobile nodes connect via other nodes to access points. The nodes are connected via some wireless links and reach other nodes in the mesh via some (ad-hoc) routing protocol. In addition, each node is registering via some access protocol to an access point (AP) for global connectivity. This creates a tree for each AP, where the AP (or the node directly connected to the AP) is the root. Nodes may change between APs due to mobility or other reasons, such as features of an AP or radio resource management.

Figure 1:
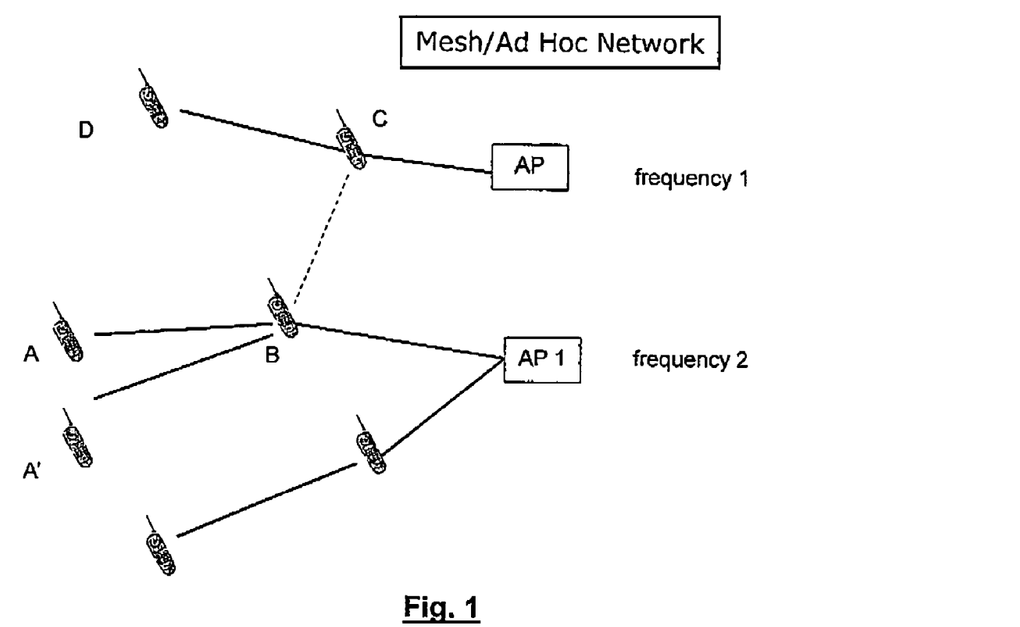
FIG. 1 illustrates a mesh network environment in which a method according to an embodiment of the invention may be performed.

FIG. 1 schematically illustrates an environment of a mesh network where there are two different access points AP1 and AP2 which may have different frequencies. One can recognize that nodes A and A' connect to access point AP1 via node B. This means that nodes B, A, and A' form a tree with node B being the root and nodes A and A' being the leafs. Between the leaf nodes and the root node there may also be further intermediate nodes and further branches, however, in the example of FIG. 1 such intermediate nodes and branches are not shown for the sake of simplicity.

Assume now than terminal B wishes to change from access point AP1 to access point AP2, in other words wants to perform a "handover" from AP1 to AP2. The reason for such a handover may be the fact that B leaves the area covered by AP1 and moves to an area covered by AP2. However, there may also be other reasons due to which the handover should be performed, e.g. the need to switch to a different frequency for radio frequency management reasons, e.g., because AP1 serves much more terminals than AP2 and the radio frequency management intends to equally distribute the load in order to avoid an overload of one access point. A further reason might consist in the desire of a certain node to switch to a different service or a service of enhanced quality (e.g. a higher bitrate) which is provided by AP2 but not by AP1. Based thereupon terminal B may need to perform a handover from AP1 to AP2.

According to the prior art the node which wants to or should perform a handover has to change individually between the two access points. However, if nodes do individual handover, connectivity breaks and nodes may have to discover AP's from scratch. This would lead to service disruptions.

It is therefore desirable to perform a handover in a manner which avoids these negative effects and which increases the handover efficiency.

SUMMARY OF THE INVENTION

According to one aspect of the invention there is provided a method for performing a handover in a mesh network for a plurality of nodes of said mesh network from a first access point to a second access point, whereas said plurality of nodes forms a tree of nodes, said tree comprising a root node and one or more further nodes connected to said root node either directly or via intermediate nodes, and said handover being performed for said tree of nodes in a coordinated fashion, said method comprising:

forwarding to said members of said tree information about said second access point and timing information to enable a coordinated handover of said nodes of said tree;

switching said root node (B) and said further nodes from said first access point to said second access point according to said timing information.

In multi-hop wireless access networks in many cases it is advantageous if a (preferably but not necessarily complete) tree or subtree of nodes performs a co-ordinated handover. As nodes rely on other nodes for access to an AP, they need to co-ordinate such handovers to avoid that the other nodes which are connected to the node which is going to perform a handover are adversely affected. By performing a co-ordinated handover for a tree or subtree the loss of connectivity can be avoided. E.g. if the root of a such a tree or subtree, say B, does a handover, then the complete sub-tree of nodes which connect to an AP through node B performs a handover as well. This avoids the connectivity losses which would arise if B alone would perform a handover. Moreover, the complete handover for a tree of nodes enables it to take into account radio resource management considerations such as to efficiently adapt to changes of radio resource management parameters like the available frequencies at access points which could act as handover camdidates, the load in the radio infrastructure, signal strength, available services, or the like.

The handover being performed in a "co-ordinated fashion" may mean that the handover is executed by the tree members in a sequential fashion whereas the sequence is chosen such that there is no connectivity loss or such that the connectivity loss is minimised. This may be done by performing the sequential handover such that the sequence is chosen according to the position of a terminal (or node) in the tree, starting with the root and then going downstream along the tree until the leafs are reached. Another possibility would be to execute the handover for the tree members simultaneously, preferably at a predefined moment of time. This may encompass some connectivity loss, however, in this case the time necessary to perform the complete handover is minimised.

The coordinated handover may be enabled by providing to the tree members information about the new access point and timing information to enable a coordinated handover. The timing information may be explicit (difining some moment in time) or implicit, such as for example a triggering message which when being received by a node triggers the handover either at once or after some time after reception of the message.

According to one aspect there is provided a method wherein said handover comprises:

determining said root (B) of said tree and said second access point;

sequentially switching said nodes of said tree starting with said root node followed incrementally by said further nodes according to their sequence into downstream direction.

This allows a co-ordinated handover in an almost simultaneous manner with minimum losses in connectivity.

According to one aspect the method further comprises:

generating a handover request message by a node in said mesh network;

forwarding said request message starting from said node into upstream direction up until an authority may determine said root of said tree and said second access point; and in response to said handover request message, determining said root node and said second access point.

The generation and upstream forwarding of a handover request message is an efficient way of finding the root node of the tree the nodes of which should participate in the handover. Through the multi-hop structure of the mesh network this allows the identification of the individual elements of the tree as those elements through which the message passes up to the root node.

Sending the handover request message upstream follows the natural configuration of the network. The message on its way upward passes through the members of the network which may be affected by the handover until the last node before the access point. The decision about the node which is selected as the root node of the tree to be handed over then may be made by the first access point, or by a dedicated authority entrusted with making such a decision (and which receives the information through the first access point). The deciding authority (which may be a dedicated radio resource management unit) may consider radio resource management considerations such as available frequencies at the candidate access points, radio load, connectivity, the number of hops, or the like and may based thereupon decide the selection of the second access point (to which the handover is made) as well as the node which acts as the root of the tree which performs the handover.

Alternatively a decision on the root of the tree and also on the second access point may be made by a node of the tree itself. E.g. on the way upstream the handover request message may pass through a network node (a mobile terminal) which itself is competent to decide on the second access point and on the root of the tree, and then the decision may be made, possibly even without forwarding the handover request message further upstream.

According to one aspect the method further comprises: in each intermediate node through which said handover request message passes on its way upstream, collecting information about the access points which are visible to said intermediate nodes and adding said information to said handover request message.

This enables the collection of information about possible second access points to which the nodes may switch in a handover. The thus collected information may then be used to determine to which access point the handover should be performed. This decision may be based on radio resource management considerations as well as on capabilities of the individual access points. Information about the capabilities of the individual (visible) access points may also be collected in this manner and forwarded into the upstream direction to the old access point.

According to one aspect the various access points in said mesh network respectively maintain a table about the different APs and the relevant parameters for determining said second access point as a handover candidate. Such parameters may include the frequencies of the respective access points, their "visibility" which means information about which nodes in the network can reach them, either directly or via other nodes, their actual and maximum load, the services offered by them, and the like. This ensures that the access points always are aware about the available access points and their respective capabilities, and it thereby enables the decision to which access point the handover should be made to be made in an efficient and well-founded manner.

The table may also include the services offered by the individual access points, additional information like about the quality of the service, or the like. The table may be updated by the information collected by the handover request messages travelling upstream towards the root node. Instead of the table being maintained by the access points (or additionally) there may be provided a centralised authority deciding on the access point for the handover and the tree members, and this centralised authority (which might be a dedicated server or entity in the network) may receive the necessary information from the handover request messages which collected this information on their way in upstream direction.

The determination about the new access point may be made by the old access point or any module or device connected thereto, possibly also in the form of a radio resource management unit which manages the radio resources such as available frequencies, services, load, signal strength, quality of service and the like for the whole network.

According to one aspect the method further comprises: forwarding a message including information about said second access point to said root node and downstream to said members of said tree.

This enables the members of said tree to prepare for the handover, they are then aware where to switch and may make their preparations accordingly.

According to one aspect the nodes which are located downstream towards the leafs of the tree either connect to the new access point as does the root of the tree or alternatively stay at their old access point. This allows those nodes which may still be able to connect to the old access point to maintain their connection to the old access point which may—depending on the circumstances—preferable to for them, e.g. if the new access point does not offer the services which they used so far or does not offer the same quality of service.

According to one aspect said downstream message includes timing information to enable a co-ordinated handover of said nodes of said tree. This makes it possible to perform the handover of the tree nodes in a co-ordinated manner thus minimising the connectivity losses due to the handover. The timing information could be explicitly specified, e.g. by a moment in time at which the handover should be performed, or it could be implicitly specified, e.g. by triggering the handover as the message is received.

According to one aspect there is further provided an apparatus for performing a handover in a mesh network for a plurality of nodes (A, A', B) of said mesh network from a first access point (AP1) to a second access point, whereas said plurality of nodes forms a tree of nodes (A, A', B), said tree comprising a root node (B) and one or more further nodes (A, A') connected to said root node either directly or via intermediate nodes, and said handover being performed for said tree of nodes (A, A', B) in a coordinated fashion, said apparatus comprising:

a forwarding unit for forwarding to said members of said tree (A,A') information about said second access point (AP2) and timing information to enable a coordinated handover of said nodes of said tree for switching said root node (B) and said further nodes (A,A') from said first access point (AP1) to said second access point (AP2) according to said timing information.

According to one aspect the apparatus comprises a determining unit for determining said root (B) of said tree and said second access point (AP2).

The determining unit may be implemented by an access point being adapted to operate in accordance with the functionality of the determining unit, or a node may operate having the functionality of the determining unit, or a separate entity may operate having the function of the determining unit.

According to one aspect the apparatus comprises a switching unit for sequentially switching said nodes of said tree starting with said root node (B) followed incrementally by said further nodes according to their sequence into downstream direction.

According to one aspect the apparatus comprises a unit for forwarding said request message starting from said node into upstream direction up until an authority can determine said root of said tree (B) and said first access point (AP1), and a unit for in response to said handover request message, determining said root node (B) and said second access point (AP2).

According to one aspect the apparatus comprises a collecting unit for collecting in each intermediate node through which said handover request message passes on its way upstream, information about the access points which are visible to said intermediate nodes and adding said information to said handover request message.

According to one aspect the apparatus comprises a maintaining unit for maintaining in an access point in said mesh network or a deciding authority respectively a table about the different access points and the relevant parameters for determining said second access point as a handover candidate, said table being fed by information collected by said handover request messages on their way in upstream direction.

According to one aspect the apparatus comprises one of the following:
a mobile node adapted to be able to connect to a mesh network;
an access point adapted to operate as an access point in a mesh network.

According to one aspect there is further provided a mobile node adapted to be able to connect to a mesh network, said mobile node comprising:
means for carrying out a method according to one of the embodiments of the invention.

The mobile node may be a cell phone, a smartphone, a PDA, a notebook or laptop, or anything alike which is capable of acting as a node in such a mesh network.

DETAILED DESCRIPTION

FIG. 1 illustrates a method for a handover in a mesh network according to a first embodiment of the invention. In this embodiment it is assumed that the two access points AP1 and AP2 operate at different frequencies. In this embodiment it can be beneficial to perform a handover for a tree or a sub-tree in several cases.

Examples of such cases are
1. If node B needs to join AP2 with different frequency, A and A' need to join as well—otherwise they (possibly) cannot connect to any AP. This may e.g. be due to the fact that they are located outside the area covered by AP1 and possibly any other access point as well so that their only possibility not to loose connection is to connect to an access point through node B. This means A and A' need to change frequency as well.
2. If A needs to join AP2, e.g. due to other features available at AP2, the node B (and possibly A') need to join as well. The reason may be the same as in case 1, namely that node A alone may not be able to connect to any access point because it is not located within the area covered by any access point.
3. If the AP 1 wants to assign node A or B to AP 2, e.g. due to radio resource management (e.g. because the load in AP 1 is too large and AP 2 has free capacity), then all 3 nodes should handover to AP 2. Otherwise there may be the risk that connectivity is lost for some of the nodes.

In this embodiment in any of cases one to three above there is performed a handover for a tree or a subtree and not for an individual node alone. The tree or subtree may comprise a root node (like in this embodiment node B) and one or more further nodes, either intermediate nodes or leaf nodes or both (in this embodiment nodes A and A'). If we speak of a "tree" or a "subtree" these terms are largely interchangeable. A tree structure means that there is some root node and the tree is formed through branches and leafs according to the classical meaning of these words, whereas a node may be a root node, a branch node or a leaf node. If the root node of such a tree is the access point or a node directly connected to an access point (such as B in FIG. 1) then one could speak of a "tree", and if the root node is located more downstream towards the leafs (such as node A in FIG. 1, assuming that there were more downstream nodes below node A) one could speak of a "subtree". However, in the following these two terms mostly are exchangeable, and a co-ordinated handover may be performed by a "tree" or by a "subtree" in this sense.

The handover furthermore is carried out in a "co-ordinated fashion". This means that the members of the tree which perform the handover either perform it simultaneously, almost simultaneously, or at least according to a certain sequence or order. There is a relationship between the handover of the tree members, e.g. they are all performed at the same time or they are performed sequentially, but then the individual handovers for the tree members are carried out within a relatively narrow time frame which makes it appropriate to still speak of a "single handover". The term co-ordinated in any case means that even if two members of a tree do not hand over exactly at the same moment nevertheless their handover is at least linked by a functional relationship (e.g. by a common "trigger" and/or by a relatively narrow time frame within which the handover is carried out). An example of such a "narrow" time frame could be a period of time which lasts less than 5 seconds, preferably less than a second, even further preferably lessor significantly less than 100 miliseconds, and the tree handover being performed within such a time frame. Another example of such a narrow time frame could be a time frame such that the handover of the complete tree is carried out within a time frame which is not or almost not noticeable by the user, in other words the handover from the point of view of the user being carried out virtually almost simultaneously.

In order to enable a complete tree or subtree to perform a handover simultaneously or virtually almost simultaneously several problems may arise. First of all it is necessary to determine the tree and its members which should perform the handover triggered by a request from one node or an access point. E.g. consider the case a node A needs to change to a new AP of another frequency, but has no direct or multi-hop connectivity to any other AP. In this case, other nodes (upstream to the AP) may have to change to the new AP and a new frequency as well. In this case the node A needs a way find such an upstream node and to initiate such a tree handover. Moreover, once the tree for the handover has been determined and the actual handover is imminent it is preferable to perform the handover in a manner which minimises disruption.

In the following embodiments will be described which take into account these aspects and provide suitable solutions.

In the following an embodiment of the invention will be described which describes in somewhat more detail how the nodes belonging to the tree or subtree are identified.

In this embodiment there is carried out a protocol comprising the following steps:
1. Based on some trigger (from a node or an AP), the protocol identifies the sub-tree and the root of the sub-tree for the handover. For this purpose, a message is sent from the node which needs to change to a new AP to its old AP. All nodes relaying this message on the way to the old AP add information on the message on visible APs. Then the (old) AP takes a decision, which includes
    a. identify the new access point to which the handover is performed
    b. identify the root of the sub-tree
2. Co-ordinate the stepwise handover between the nodes, starting from the root, to perform a tree-handover with minimal disruption. This means that the root informs the nodes about the target AP and frequency etc. for the handover. Then the root performs a handover and the nodes below in the tree will loose connectivity for short time, but already know the new frequency/parameters of the root and can reconnect to the root and further to the new AP2 more quickly. This process is repeated incrementally down the tree to the leaves.

The selection of the root node of the (sub-)tree which should perform a handover may be based on several considerations. According to a first embodiment in which the handover is not triggered by a node but by an access point the selection may be based on radio resource management considerations, e.g. on radio load and radio frequency considerations. E.g. the access point may serve too many nodes connecting thereto so that there may arise a critical situation such that the access point may be unable to accept connection requests from newly entering nodes. This may require from a radio frequency management perspective a shift of a part of the nodes connected to this access point to a different access point which has presently a less heavy load.

The decision may then be made in a way such that at first a suitable neighbouring access point is selected based on the load of the various neighbouring access points. Then the access point from which the handover should start looks among the nodes connected to it for a suitable root node which together with its corresponding (sub-)tree may be shifted or switched to the selected neighbouring access point. For that purpose it may be checked to which of the nodes directly connected to the old access point the selected new access point is "visible", in other words which of the nodes could also connect to this new access point. This information could either be obtained by requesting this information from the individual nodes which may in turn check which access points are visible (reachable) to them, or it may be obtained based on location information about the nodes which might be available to the old access point. It should be noted here that the information about "visible" or "reachable" access points for a certain node may include not only such access points which are directly "visible" or reachable but also those access points which are only accessible or reachable via other (intermediate) nodes. In FIG. 1 this is schematically illustrated by the connection between nodes B and C which indicated that the connection from B to AP 2 may be made via intermediate node C.

When performing a co-ordinated tree handover several decisions have to be made. First of all the new access point to which a handover should be performed has to be determined.

Secondly the root node of the tree which should perform the co-ordinated handover has to be determined. These two decisions are now explained in somewhat more detail in the following.

If there are multiple candidates as new access point for the handover the old access point (or any "authority" competent for making such a decision) may select the candidate which fits most in terms of relevant parameters which influence such a decision. These parameters can for example be parameters involved in the radio resource management, e.g. radio frequencies assigned to the individual access points. E.g. the decision to which access point the handover should be performed can be based on radio frequency management considerations, e.g. a new access point may be selected which reduces the load on the old access point while still the new access point having free capacity. If multiple new access points would be possible based on such considerations a selection could be based on further criteria, e.g. the one could be selected which reduces the load at the old access point while itself it still has the lowest load yet so that there can be achieved a most balanced approach for the radio load.

Regarding the root node of the tree for which the handover is performed a somewhat different decision strategy may be followed. To first illustrate the question to be decided reference is made to FIG. 2, and it should be assumed that there are further nodes downstream below the nodes A and A' which, however, are not shown in FIG. 2. If from any of these nodes a handover request is generated the tree which is handed over may have the root B as a root node or any other node more downstream towards the node from which the handover request originated.

Assuming that there are multiple candidates as root nodes for the handover the old access point (or any other "authority" competent for making such a decision) may select the candidate which fits most in terms of relevant parameters which influence such a decision. These parameters can for example be parameters involved in the radio resource management, e.g. radio load. E.g. the selection could be made such that there is selected a node as the root node which reduces the radio load at the old access point to the largest extent. In the present example and with reference to FIG. 2 this would be node B. However, if the radio load at the new access point already is relatively large a more downstream located node (such as node A or another even more downstream located node which is not shown in FIG. 2) may be selected as the root node.

Figure 2:
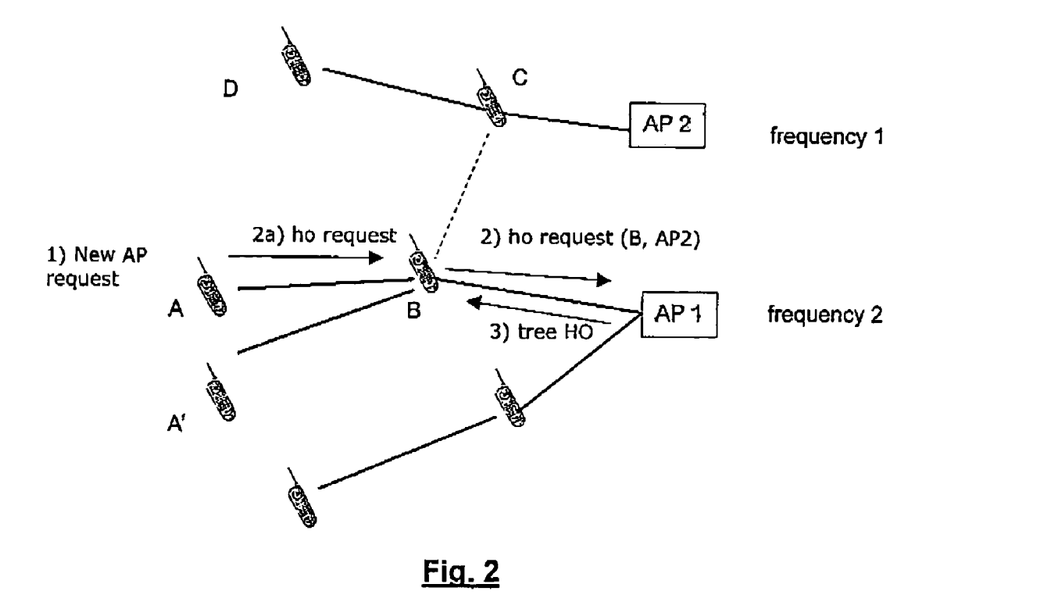
FIG. 2 illustrates the first three steps of a tree handover according to an embodiment of the invention.

Alternatively or additionally further parameters may be taken into account. Such additional parameters may e.g. include the number of hops which are necessary to connect to a new access point, or the signal strength which can be achieved when choosing a certain root node. Referring to FIG. 2 one can e.g. assume that the new access point AP 2 is reachable through node B via node C with a relatively low signal strength, and that alternatively access point AP 2 could also be reached through node A but via intermediate nodes D and C. In this embodiment there is a higher weight given to the number of hops (a smaller number of hops is preferred) than to the signal strength, and for this reason node B would be selected as a root node rather than node A. However, other schemes for determining the root node also can be imagined, and the parameters wich influence the decision may be collected and then the decision be made.

It should be mentioned here that such a decision not necessarily has to be made by the access point itself from which the handover starts. Instead there may be a specific and dedicated entity (e.g. a radio resource management unit) which may be implemented by dedicated software or hardware or both and which is responsible for making such a decision. The relevant parameters are then forwarded to such a "deciding authority" which may then make the decision in a way such as to optimise the radio resource management based on the relevant parameters. It then informs the network elements about the decision.

According to one embodiment even the network nodes may be involved in the decision and may even be entrusted with making the decision. E.g. the network node B shown in FIG. 2 may be adapted by some appropriate software and hardware to operate as a deciding authority and may decide that either itself or any other node downstream may act as a root node in the handover.

Once the root node and the new access point for the handover are selected the handover for the thus determined tree may be performed. In one embodiment all downstream nodes in the tree defined by the thus selected root node are included in the handover, in other words the complete tree (or subtree) starting from the selected root node down to each leaf node performs the handover.

The triggering of the handover can be performed by an access point or by the deciding authority which decides on the next access point and on the root node. Alternatively the trigger of a handover may be performed by a node of the network which is—either directly or via other intermediate nodes—connected to an access point.

In the following such an embodiment in which the handover is not triggered by the access point or the deciding authority but rather by a (triggering) node connected to an access point, either directly or indirectly via one or more other intermediate nodes is described in somewhat more detail. In this case the tree involved in the handover in one case includes all the nodes in upstream direction starting from the triggering node up to the access point, the latest upstream node being directly connecting to the access point then forming the root of the tree. The members of the tree in one case are all nodes in downstream direction starting from the root node. A handover then in a typical case involves the complete tree, although such a handover of a "complete tree" is not necessarily the case as will become apparent from some embodiments which will be described later.

The selection of the new access point to which the handover is performed may also be based—like in the embodiment described before—on radio resource management considerations. In an alternative embodiment the root node is not the node located in upstream direction most closely to the access point but rather an intermediate node which also is located into upstream direction starting from the triggering node but not being the one directly connected to the access point. Whether the node which is located most upstream or a more downstream located node is selected as the root node may also be decided—like in the previous embodiment—based on radio resource management considerations, and the decision may be made also like in the previous embodiment by some deciding authority. E.g. selecting the node which is located most upstream may lead to a tree which is too big to be handed over when considering the load of the new access point. In such a case it may be decided that only a subtree is handed over the root node of which is located more into the downstream direction. In another case the selection of the most upstream located node as the root node may have the effect that a handover of the thus defined tree would lead to shorter length of the connection path in terms of number of hops after the handover than it would be the case if a more downstream located node would be selected as the root node for the tree to be handed over. This can be the case if only the more upstream node can possibly connect to a node more closely located to an access point. In this case the deciding authority may select a mode upstream located node as the root node. On the other hand, if a more downstream located node is able to connect to the new access point through a less number of hops than a more upstream node, then this more downstream node may be selected as root node for the tree to be handed over. In such a case one could speak of a "subtree" being handed over rather than a "tree" because the root node is not a node which is located most upstream in the wireless network structure but more downstream, thereby selectring only a substructure compared to a "whole tree structure" is it would be defined by a node directly being connected to the access point.

In both of the foregoing embodiments there are a plurality of nodes forming a tree the nodes of which are handed over from one access point to another access point. This provides several advantages compared to the handover being performed individually for individual nodes. For example, according to these embodiments APs (or other "deciding authorities") can assign trees or sub-trees of nodes to other APs, which is useful for load balancing or radio resource management. As the tree or sub-tree consists of geographically adjacent nodes, this can be used for radio resource/interference control. A deciding authority (which may be an access point) is aware of the relevant parameters for making such a decision, and based on these parameters the deciding authority may e.g. decide to hand over a certain tree or subtree to a different access point which e.g. has a different frequency, thereby achieving a more effective radio resource management (e.g. in the sense of avoiding interferences, balancing the load, etceteras).

Moreover, nodes can handover to other access points by help of (or triggered by) other nodes, which is not possible by individual handover. This is done by triggering a handover of other upstream nodes which are located upstream from a node which is initiating the handover towards a new access point. Furthermore, if a sub-tree performs a handover, all of its nodes can perform an efficient, coordinated handover which means that the connectivity losses are minimised.

In the following a further embodiment will be described which describes in more detail the procedure of a subtree handover in connection with FIGS. 2 to 4. FIG. 2 illustrates the first to third steps executed according to this embodiment.

Step 1—new AP request: Node A requests a new AP, e.g. due to different capabilities being required which can not be fulfilled by the old access point and which make it necessary to switch to a different access point. Such a capability could be e.g. a service or a quality of service which is offered by a new access point but not by the one to which the node is presently connected.

Step 2—handover (ho) request: Node A sends a request via B to AP 1 (messages 2*a*) and 2) in FIG. 2). B adds information about reachable APs, if available. This means that the request on its way in upstream direction collects information about "visible" access points which means about access points which can be reached by the intermediate access points through which the handover message passes on its way upstream. Message 2) in FIG. 2 may then contain such additional information which is indicated schematically in FIG. 2 by (B, AP2), whereas AP2 indicates a "visible" access point and B indicates the node to which it is visible. This information can then later be used as relevant information by a deciding authority to decide on which new access point to select as well as on which node to select as the root node of the tree to be handed over.

Step 3—tree handover preparation: AP 1 decides that the complete sub-tree below node B shall handover to new access point AP 2 and triggers B to initiate the tree handover. This is schematically indicated in FIG. 2 by the message 3). In this embodiment AP 1 is the deciding authority which decides on the new access point and the selected root node. In an alternative embodiment AP 1 could forward the handover request message and the information collected by this request message on its way upstream to a separate deciding authority which then makes a decision, possibly taking into account also information which was obtained from different parts of the network, e.g. from other access points. In the present embodiment it is assumed that AP 2 operates on a different frequency and that based on radio resource management considerations as well as based on considerations involving the capabilities of the access points in the network AP 2 was selected as the new access point by the deciding authority. This means that the tree to be handed over has to switch to a new frequency.

Figure 3:
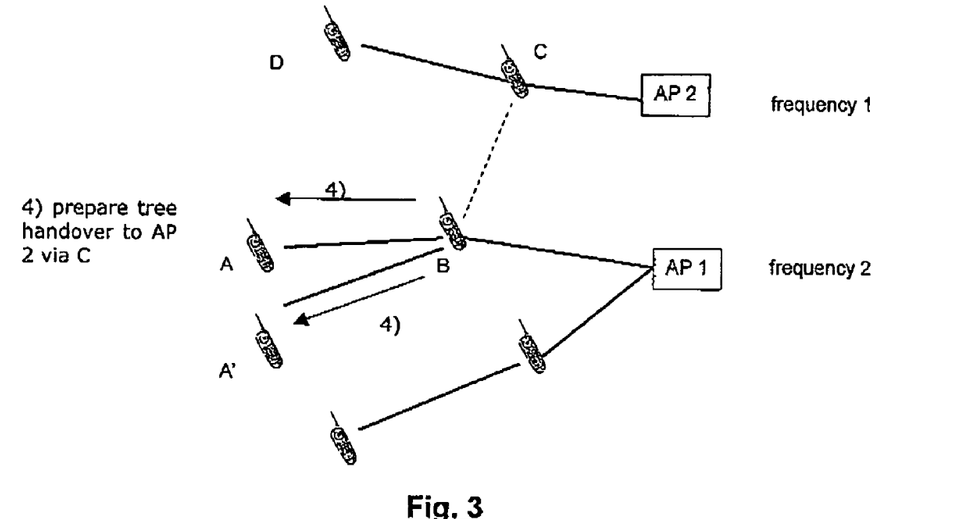
FIG. 3 illustrates the step of preparing a tree handover according to an embodiment of the invention.
Figure 4:
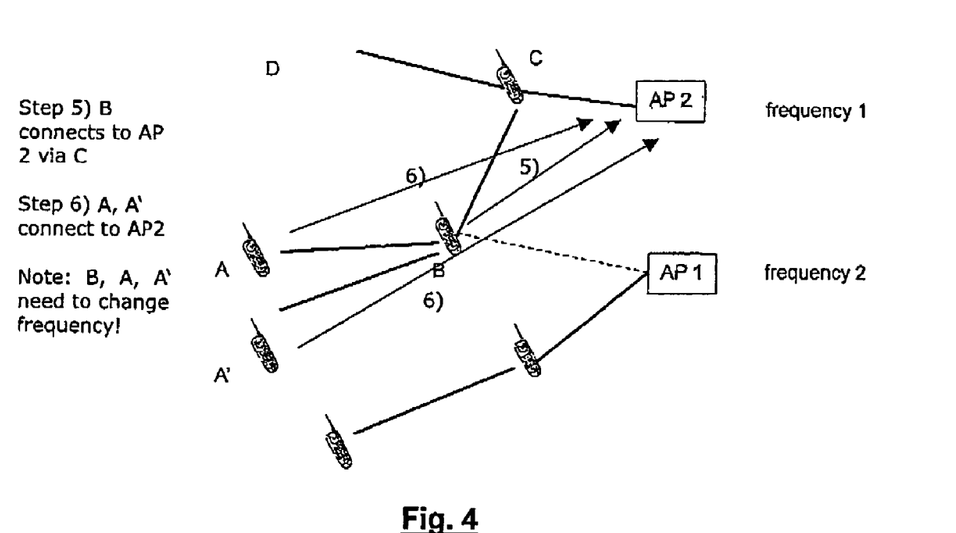
FIG. 4 illustrates the actual execution of a tree handover according to an embodiment of the invention.

To further illustrate a handover method according to an embodiment of the invention reference is now made to FIG. 3. It is assumed here that the deciding authority, here AP 1, has decided that the handover should be carried out to AP 2 via the node C.

Step 4—tree handover preparation: In this step which is illustrated in FIG. 3 node B notifies the nodes in its subtree for which it is the root node that they should perform a handover together with B. For that purpose the necessary information such as the ID of the new access point, the new frequency and any other parameters necessary for the handover are communicated to these nodes. This is schematically illustrated by the messages 4) shown in FIG. 3. The nodes which are located downstream (towards the leafs of the subtree) can either look for alternative APs (e.g. to stick to their old access point, as will be described in somewhat more detail below) or follow B to AP 2. Following node B to AP 2 typically involve less efforts because the downstream nodes can continue to use the connection to their respective upstream nodes, i.e. a "complete handover procedure" which involves the establishment of a connection with the new access point, negotiation of communication parameters, etc. is not necessary Instead the already existing connection with the upstream node may be used and only some parameters such as the frequency have to be adapted to the new access point.

The execution of the actual handover according to an embodiment of the invention will now be described with reference to FIG. 4.

Step 5—actual handover: In this step which is illustrated in FIG. 4 the root node of the subtree performs the handover. This is schematically illustrated by the arrow labeled 5) in FIG. 4. In this case the root node is node B. Node B in this embodiment connects to the new access point AP 2 not directly but via intermediate node C. Alternatively B could also directly connect to access point AP 2 if it is located within the coverage area of AP 2. The decision to which access point the handover should be performed and via which path (directly or via an intermediate node) may be done by the previous access point AP 1 (or by any other deciding authority) based on the actually available access points and the paths through which they may be reached. The information about the available access points is obtained, accumulated and forwarded to the old access point AP 1 in step 2 described before as the handover request message makes its way upstream towards the old access point AP 1 and as it collects information about available access points. The decision to which AP the handover is made may be made based on considerations such as radio frequency management, capabilities and load of the available access points, the number of hops of a connection after the handover, signal strength, and the like.

It should be mentioned here that "collecting the additional information by the handover request message" dos not mean necessarily that the additional information about visible access points is actually "added" to the handover request message in the sense that two strings are concatenated. It will be understood that this means rather that the handover request message on its way upstream triggers the collection of the additional information which then also is forwarded upstream, either together with the handover request message or separately as a separate message.

Step 6—actual handover: Once the root node B has switched to new access point AP 2 the other nodes in the subtree (nodes A and A') also switch to the new access point. This is also illustrated in FIG. 4 schematically by the arrows labeled 6). The connection of A and A' thereby is made via the route node B and the intermediate node C through which the root node B connects to AP 2 as can also be seen in FIG. 4. It should be noted here that the switching to new access point AP 2 requires B, A, and A' to switch frequency from frequency 2 to frequency 1.

In the following there are described some variations of the embodiments described hereinbefore.

According to one embodiment the relaying nodes or intermediate nodes which forward the request for a handover from its originating node upstream to the next access point (or upstream until it reaches a competent deciding authority) add information about the visible access points which are visible to these intermediate nodes, in other words, to which these intermediate nodes could connect. This may include access points to which these intermediate nodes could connect directly as well as such access points through which a connection could be established via another intermediate node. This means that the handover request message on its way upstream accumulates information about available access points. This may not only include the IDs of the respective access points themselves but also about their capabilities such as offered services, bandwidth, etc. The information about the visible access points may be collected continuously by the intermediate nodes, e.g. in regular intervals, without an explicitly being triggered by the handover request message. This avoids the delay which would occur if an intermediate node receiving such a handover request from a downstream node would at first have to collect this information before it could be added to the handover request which needs to be forwarded further into upstream direction until it reaches the access point.

In the steps 4 to 6 above which relate to the preparation and the actual execution of the handover, some synchronisation between the handovers of the root node and its downstream nodes is be preferable. This can be achieved e.g. by adding timing information to message 4 (or to message 3 and then to the messages 4), 5), and 6)). This timing information could be explicit timing information or implicit timing information. In case of explicit timing information the information could indicate a certain moment of time at which the handover is to be performed. This explicit time information would then inform the nodes of the subtree at which time the handover should actually be executed and thereby minimises the overall time needed to perform the handover. In case of implicit timing information there is not indicated a specific moment in time, rather message 4 is interpreted as a notification of imminent handover. In other words the nodes receiving message 4 would be triggered by this message to perform the handover without delay, thereby interpreting the message 4 as implicitly containing timing information stating that the handover is now to be performed. This minimises the loss of connectivity because a downstream node only executes a handover after its corresponding upstream node already has executed the handover.

According to one embodiment the various access points respectively maintain a table about the different APs, their corresponding frequencies, their features and which features are available on which frequencies. The information for maintaining such a table may obtained by learning from messages which are relaying handover request messages into upstream direction and which collect this information as described before. Alternatively (or additionally) this information can be obtained by configuration of the access point network infrastructure and be stored in advance as a kind of a priori knowledge. The information may also be obtained by information exchange between the access points which may regularly (or in response to a change) inform each other about their respective capabilities and parameters. In another embodiment a dedicated deciding authority may collect this information, possibly being fed by the access points which in turn receive their information from the handover request messages and the information collected by them as described before.

According to one embodiment the deciding authority which decides on the new access point and the root node of the tree to be handed over may be itself a node of the network. Such a node may be a mobile terminal or any other device acting as a node in the network, being connected to an access point directly or via intermediate nodes, and being adapted to carry out a decision ton the new access point to be used for the handover and on the root node of the handover tree. The information for making such a decision reaches the node e.g. by the handover request message which on its way upstream as described before collects the relevant information about visible nodes and their capabilities.

According to one embodiment one (intermediate or root) node can support two frequencies at the same time. In such a case and contrary to a previous embodiment. then the downstream nodes connecting to this node do not have to change frequency when they are switching to a new AP together with this node which can support two frequencies.

According to one embodiment it may be possible that some nodes in the sub-tree can connect to the old AP in another way and may not want to change. In this case, these nodes are informed early about the change and can proactively change to a different path to the old AP.

According to one embodiment the APs use frequency assignment (e.g. dynamic frequency selection DFS as in IEEE 802.11h) to assign nodes to frequencies according to their features. This enables a suitable and efficient radio frequency management.

It will be understood by the skilled person that the embodiments described hereinbefore may be implemented by hardware, by software, or by a combination of software and hardware. The described apparatuses, and in particular their described units performing the described operations, the mobile nodes, the access points, the deciding authority and all other elements described in connection with the embodiments of the invention may be implemented by suitably selecting and programming hardware components such that they operate as described hereinbefore. In particular embodiments of the invention may be implemented by a method for performing a handover as described hereinbefore but also by any apparatus for performing a handover in a mesh network as described hereinbefore. Such an apparatus may be a node of the network (such as a mobile phone, a smartphone, a PDA, or any device which may connect to a mobile network), an access point of the network, any other network element, such as e.g. a deciding authority described hereinbefore, or any mobile network either as a whole or in part. Any skilled person will recognize that such an apparatus can be implemented by making use of any programmable apparatus such as a microprocessor, a signal processor, or the like, e.g. a standard standalone computer, said apparatus being suitably programmed such that it is able to perform the operations as described hereinbefore. An embodiment of the invention may further be implemented by a computer program, eiter recorded on a data carrier, stored in a memory or embodied by or transmitted bia a communications link, said computer program being able to when being run on a computer cause the computer to carry out a method according to an embodiment of the invention.

The invention claimed is:

1. A method for performing a handover in a mesh network for a plurality of nodes of the mesh network from a first access point to a second access point, whereas the plurality of nodes forms a tree of nodes, the tree comprising a root node and one or more further nodes connected to the root node either directly or via intermediate nodes, and the handover being performed for the tree of nodes in a coordinated fashion, the method comprising:
   determining the root of the tree and the second access point;
   forwarding to the nodes of the tree information about the second access point and timing information to enable a coordinated handover of the nodes of the tree;
   switching the root node and the further nodes to disconnect from the first access point and subsequently to connect to the second access point according to the timing information; and
   sequentially switching the nodes of the tree starting with the root node followed incrementally by the further nodes according to their sequence into downstream direction.

2. The method of claim 1, further comprising:
   generating a handover request message by a node in the mesh network;
   forwarding the request message starting from the node into upstream direction up until an authority can determine the root of the tree and the first access point, and
   in response to the handover request message, determining the root node and the second access point.

3. The method of claim 2, further comprising:
   in each intermediate node through which the handover request message passes on its way upstream, collecting information about the access points which are visible to the intermediate nodes and adding the information to the handover request message.

4. The method of one of claim 3, wherein
   the various access points in the mesh network or a deciding authority respectively maintain a table about the different access points and the relevant parameters for determining the second access point as a handover candidate.

5. The method of claim 4, wherein the table is fed by information collected by the handover request messages on their way in upstream direction.

6. The method of claim 5, further comprising:
   determining the second access point based on the information contained in the handover request message.

7. The method of claim 1, wherein
   the selection of the second access point and the root node of the tree to be handed over is made based on radio resource management considerations.

8. The method of claim 1, wherein
the nodes which are located downstream towards the leafs of the tree either connect to the second access point as does the root or maintain connection to their old access point.

9. An apparatus for performing a handover in a mesh network for a plurality of nodes of the mesh network from a first access point to a second access point, whereas the plurality of nodes forms a tree of nodes, the tree comprising a root node and one or more further nodes connected to the root node either directly or via intermediate nodes, and the handover being performed for the tree of nodes in a coordinated fashion, the apparatus
comprising:
a determining unit for determining the root of the tree and the second access point;
a forwarding unit for forwarding to the members of the tree information about the second access point and timing information to enable a coordinated handover of the nodes of the tree for switching the root node and the further nodes to disconnect from the first access point and subsequently to connect to the second access point according to the timing information; and
a switching unit for sequentially switching the nodes of the tree starting with the root node followed incrementally by the further nodes according to their sequence into downstream direction;
wherein at least one of the determining unit, the forwarding unit, and the switching unit is implemented on hardware alone or is implemented on hardware in combination with software.

10. The apparatus of claim 9, further comprising:
a unit for generating a handover request message by a node in the mesh network;
a unit for forwarding the request message starting from the node into upstream direction up until an authority can determine the root of the tree and the first access point, and
a unit for in response to the handover request message, determining the root node and the second access point.

11. The apparatus of claim 10, further comprising
a collecting unit for collecting in each intermediate node through which the handover request message passes on its way upstream, information about the access points which are visible to the intermediate nodes and adding the information to the handover request message.

12. The apparatus of claim 11, further comprising:
a maintaining unit for maintaining in an access point in the mesh network or a deciding authority respectively a table about the different access points and the relevant parameters for determining the second access point as a handover candidate, the table being fed by information collected by the handover request messages on their way in upstream direction.

13. The apparatus of claim 9, wherein the apparatus comprises one of the following;
a mobile node adapted to be able to connect to a mesh network;
an access point adapted to operate as an access point in a mesh network.

* * * * *